United States Patent [19]

Brihier et al.

[11] Patent Number: 4,759,217
[45] Date of Patent: Jul. 26, 1988

[54] PROCESS AND APPARATUS FOR BALANCING A VEHICLE WHEEL

[75] Inventors: Gerard C. Brihier, Ollainville; Luc Renaud, Nonancourt; Jacques M. Hennes, Ezy-sur-Eure, all of France

[73] Assignee: Facom, Morangis, France

[21] Appl. No.: 906,075

[22] Filed: Sep. 11, 1986

[30] Foreign Application Priority Data

Sep. 12, 1985 [FR] France ................... 85 13556

[51] Int. Cl.⁴ .................................. G01M 1/22
[52] U.S. Cl. ................................. 73/462
[58] Field of Search ................... 73/462, 1 B

[56] References Cited

U.S. PATENT DOCUMENTS 3,272,015 9/1966 Behm .
4,494,400 1/1985 Hill .
4,655,080 4/1987 Ongaro ................... 73/462

FOREIGN PATENT DOCUMENTS 0032413 7/1981 European Pat. Off. .

OTHER PUBLICATIONS

Patent Abstracts of Japan, vol. 7, No. 117 (P-198)[1262], May 21, 1983.

Primary Examiner—John Chapman
Attorney, Agent, or Firm—Wenderoth, Lind & Ponack

[57] ABSTRACT

The wheel (3) to be balanced is mounted on a rotatable shaft carried by two spaced bearings (6, 4) provided with force sensors ( 8, 10). Two standard weights are mounted on the wheel rim at two points spaced angularly apart. The sensors (8, 10) signal the forces exerted on the bearings by the rotation of the wheel equipped with said weights. The weights are then removed and a new measurement ofthe forces exerted on the bearings is made. The values and the positions of the correcting weights to be placed on the wheel are then determined from the characteristic relationship of the wheel-apparatus assembly obtained by comparison of the results of these two measurements.

15 Claims, 1 Drawing Sheet

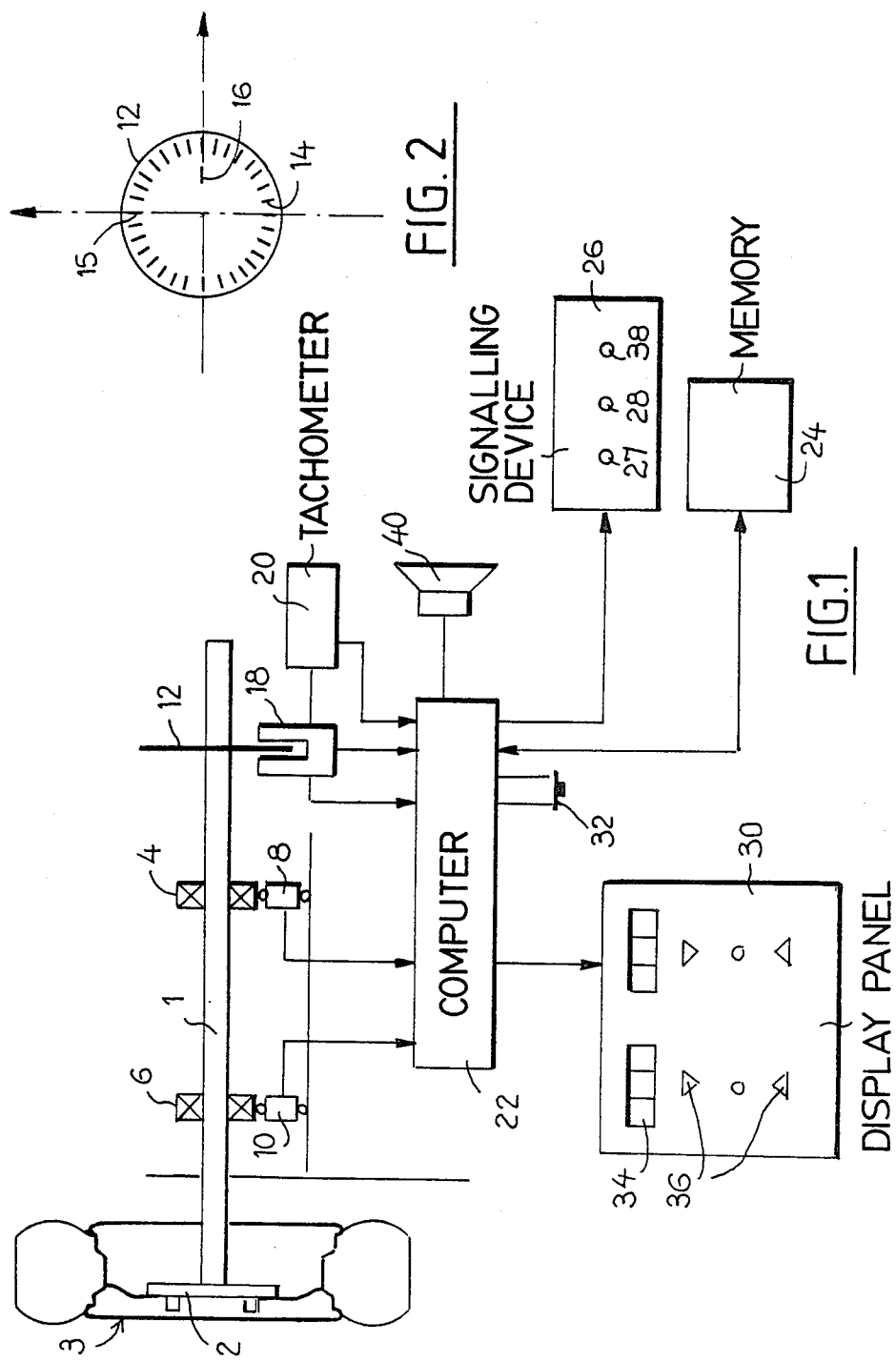

PROCESS AND APPARATUS FOR BALANCING A VEHICLE WHEEL

BACKGROUND OF THE INVENTION

The balancing of vehicle wheels or other rotating parts is at the present time effected with the aid of machines comprising a shaft intended to support the wheel and driven rotationally, being mounted in two bearings spaced apart and each provided with a force sensor. A device enables the rotation of the shaft to be monitored continuously, while a computer receiving information from this device and also the signals coming from the sensors determines the correction masses to be attached to the wheel on the basis of a relationship dependent on the diameter of the wheel, its speed of rotation, as well as on the sensitivity of the sensors, the distance between bearings, the distance between the first bearing and the nearer side of the wheel rim, and the width of the wheel.

The operator must therefore measure the diameter of the wheel, the width of the rim, and the distance between the first bearing and the rim by means of potentiometers, keyboards, or any other appropriate device, thereby entailing a risk of mismeasurement and the inputting of incorrect data into the computer.

It should in addition be observed that the speed of rotation, the sensitivity of the sensors, and the distance between bearings are considered as constants for a determined machine. However, the speed of rotation varies as a function of the mains voltage and frequency, while the sensitivity of the sensors may vary with the weather or temperature, so that additional inaccuracy occurs in the measurement.

SUMMARY OF THE INVENTION

The present invention seeks to obviate these disadvantages by providing a dynamic balancing process and machine which make it possible to obtain a highly accurate measurement in a simple manner.

The invention therefore provides a process for the balancing of a wheel or the like mounted on a shaft which is driven rotationally and supported by two spaced bearings, each of which is associated with a force sensor, said process consisting in taking two weights of known values and placing them one on each side of the wheel rim in positions separated by an angular distance of a given value, effecting a first measurement by means of the sensors of the forces generated in the bearings by the rotation of the wheel, removing the two weights, remeasuring effecting a second measurement of the forces generated in the bearings by the rotation of the wheel, comparing the results of the two measurements, solving the characteristic relation of the wheel-apparatus assembly, and combining the solution with the result of the second measurement to obtain the values of the balancing weights required for compensating for the unbalance of the wheel.

With this process it is no longer necessary to take into account the diameter or width of the wheel, or even the distance between the bearings, so that the risk of error due to the measurements made by the operator is completely eliminated. Similarly, the sensitivity of the sensors no longer affects the measurement, because the result is obtained by comparison of the two measurements made.

The invention also provides a balancing machine which is provided with means for determining the angular position of the shaft relative to a reference position, a memory storing the force values measured by the sensors, means for computing from the forces measured, and from the variation of the angular position of the shaft, the values of correcting weights to be placed on the wheel for a first measurement and then for a second measurement, and for comparing these values with one another and solving the characteristic relation of the wheel-apparatus assembly, said memory also storing this relation.

The machine is also provided with means for monitoring the speed of rotation of the shaft.

DESCRIPTION OF THE DRAWINGS

The description below of one embodiment, given as a non-limitative example and illustrated in the accompanying drawings, will in addition make clear the advantages and characteristics of the invention.

In these drawings,

FIG. 1 is a schematic view of a balancing machine according to the invention, and FIG. 2 is a front view of the disc for determining the angular position of the shaft.

DESCRIPTION OF THE PREFERRED EMBODIMENT

The balancing machine shown comprises in the usual manner a shaft 1 provided at one end with a support 2 intended to receive the object to be balanced, for example an automobile vehicle wheel 3.

The shaft 1 is driven rotationally by a drive system, which in order to simplify the drawings has not been shown. It is in addition supported by two bearings 4 and 6 respectively, which are spaced part and on each of which a force sensor 8, 10 is mounted.

The shaft 1 also carries a disc 12 determining its angular position, this disc having on its periphery a series of slits 14 spaced regularly over a circumference around its axis. An additional slit 16 is provided in the disc 12, in a position further inwards than the slits 14, that is to say the slit 16 is offset radially inwards relative to the slits 14. The number of slits 14 in the disc 12 is preferably a multiple of four, this number being for example 4n.

The disc 12, which is fixed to rotate with the shaft 1, moves in front of an optical scanner 18, which detects independently the passage of the outer slits 14 and that of the inner slit 16. This optical scanner detects in addition the direction of rotation of the disc 12 and it is associated with a tachometer 20.

The sensors 8, 10 transmit the signals corresponding to the forces measured to a computing and processing device 22, which also receives information from the optical scanner 18 and the tachometer 20.

For the purpose of balancing a wheel 3 which has been mounted on the support 2 of the shaft 1, two weights of known values are placed on the rim of this wheel in positions spaced angularly apart by a given value, whereupon the wheel is driven by means of the motor (not shown) until it acquires a relatively high speed of rotation. When this speed has been reached, the sensors 8 and 10, which measure the forces exerted on the bearings 4 and 6 by the rotation of the wheel 1, transmit to the computer 22 signals corresponding to the components of the forces applied. The device 22 records these signals by transmitting them to a memory 24.

This device 22, which also receives the information from the optical scanner 18, knows the angular position of the shaft and consequently that of the wheel. It also knows the speed of rotation of the wheel and starts to record the signals transmitted by the sensors as soon as this speed has attained a given value. The force component signals transmitted by the sensors 8 and 10 are then sampled and digitized on each passage of a slit 14 in front of the optical scanner 18. The computer therefore calculates the components of the signals for each of these values sampled. It deduces therefrom the relation relating the components of the correcting weights to be placed on the rim edge rings to the components of the signals measured.

During this first measurement, that is to say when the wheel is fitted with the known weights, this relation is of the type:

$$\begin{bmatrix} -m_{1x} + m_{ex} \\ -m_{2x} + m_{ix} \end{bmatrix} = \begin{bmatrix} a & b \\ c & d \end{bmatrix} \times \begin{bmatrix} S_{1x} \\ S_{2x} \end{bmatrix} \quad (I)$$

$$\begin{bmatrix} -m_{1y} + m_{ey} \\ -m_{2y} + m_{iy} \end{bmatrix} = \begin{bmatrix} a & b \\ c & d \end{bmatrix} \times \begin{bmatrix} S_{1y} \\ S_{2y} \end{bmatrix}$$

in which $m_1$ and $m_2$ are the correcting weights intended to compensate for the individual unbalance of the wheel, while $m_e$ and $m_i$ are known standard weights placed on the wheel, $S_1$ and $S_2$ being the signals supplied by the two sensors.

The weights are then removed from the rim of the wheel 3, whereupon the wheel is again driven rotationally and a new measurement is made, so that the device 22 receives from the sensors 8 and 10 new force component signals, on the basis of which it determines the relation of the components of the correcting weights to be placed on the wheel to compensate for the unbalance alone. The device 22 then compares the result obtained with that stored in the memory 24, and deduces therefrom the characteristic relation of the wheel-apparatus assembly.

During this second measurement, that is to say after the standard weights have been removed, the relation is of the form:

$$\begin{bmatrix} -m_{1x} \\ -m_{2x} \end{bmatrix} = \begin{bmatrix} a & b \\ c & d \end{bmatrix} \times \begin{bmatrix} S'_{1x} \\ S'_{2x} \end{bmatrix} \quad (II)$$

$$\begin{bmatrix} -m_{1y} \\ -m_{2y} \end{bmatrix} = \begin{bmatrix} a & b \\ c & d \end{bmatrix} \times \begin{bmatrix} S'_{1y} \\ S'_{2y} \end{bmatrix}$$

which by subtraction of (II) from (I) gives:

$$\begin{bmatrix} m_{ex} \\ m_{ix} \end{bmatrix} = \begin{bmatrix} a & b \\ c & d \end{bmatrix} \times \begin{bmatrix} S_{1x} - S'_{1x} \\ S_{2x} - S'_{2x} \end{bmatrix} \quad (III)$$

$$\begin{bmatrix} m_{ey} \\ m_{iy} \end{bmatrix} = \begin{bmatrix} a & b \\ c & d \end{bmatrix} \times \begin{bmatrix} S_{1y} - S'_{1y} \\ S_{2y} - S'_{2y} \end{bmatrix}$$

which corresponds to the characteristic relation of the wheel-apparatus assembly, this relation being linear in form and constant for a given type of wheel, that is to say in practice for all the wheels of a given vehicle.

Standard weights of identical value are preferasbly used, so that $m_e = m_i$.

Furthermore, by selecting, as indicated above, a disc 12 in which the slits 14 are equal in number to 4n, it is possible to give the standard weights positions such that they are separated by an angle of 90°.

This is easily achieved with the aid of the apparatus shown in FIG. 1, by turning the wheel 3 until the optical scanner 18 signals the presence of the slit 16, and placing the first standard weight vertically in line with the shaft 1. The wheel 3 is then turned again until the optical scanner 18 signals the passage of the slit 15 which is separated from the first slit by n slits 14, that is to say by an angle of 90°. The second standard weight is then fixed on the rim of the wheel 3.

In the embodiment shown in FIG. 1 the device 22 is connected to a signalling device 26 comprising in particular two lamps 27 and 28 respectively signalling to the operator the detection of the slit 16 and the slit 15 respectively.

When the standard weights are thus placed at 90° to one another, the position of the shaft 1 on the detection of the slit 16 may be taken as reference position, so that the component $m_{ix} = 0$, which is also true of the component $m_{ey}$. $m_{iy}$ is then equal to $m_i$ and $m_{ex}$ equal to $m_e$, and when two equal weights have been selected, that is to say $m_e = m_i = m$, the following relation is obtained:

$$\begin{bmatrix} m \\ 0 \end{bmatrix} = \begin{bmatrix} a & b \\ c & d \end{bmatrix} \times \begin{bmatrix} S_{1x} - S'_{1x} \\ S_{2x} - S'_{2x} \end{bmatrix} \quad (IV)$$

$$\begin{bmatrix} 0 \\ m \end{bmatrix} = \begin{bmatrix} a & b \\ c & d \end{bmatrix} \times \begin{bmatrix} S_{1y} - S'_{1y} \\ S_{2y} - S'_{2y} \end{bmatrix}$$

In order to determine a b c d, the computer 22 has to solve a system of four equations with four unknowns. It then introduces these values in the relation II, thus giving it the components of the balancing weights to be placed on the outer and inner rim rings.

The device 22 also indicates the absolute values of the balancing masses and their position in relation to the reference axis constituted by the axis passing through the slit 16 and the centre of the disc 12. These results are displayed on a panel 30, while the values a, b, c, d are stored in the memory 24.

The machine illustrated also preferably contains a control circuit provided with a switch 32 which, when closed, makes it possible to initiate the operation of the assembly comprising the computer and the memory 24, but which when open deletes the memory.

The display panel 30 indicates in the usual manner, at 34 on the one hand, the values of the weights to be placed on the rim and, on the other hand by means of the illuminated arrows 36, the movement to be made to reach the position in which these weights have to be placed.

In order to simplify the operator's work, the device 22 is in addition connected to an illuminated signal 38 and/or acoustic signal 40 which warns the operator of the end of each of the measurements to enable him to slow down the wheel, either in order to remove the standard weights or to add the correcting weights in accordance with the information supplied by the display panel 30.

It is clear that the operator does not have to intervene before the placing of the standard weights on the wheel, and that it is no longer necessary for him to make any measurements of parameters of this wheel, or even of the parameters of the machine, for the purpose of inputting such parameters into the device 22. Only the speed of rotation intervenes in the measurement, which can be hindered only by errors in this speed of rotation or possibly by errors in the position of the standard weights. The indications given are therefore reliable and the risk of error is extremely slight.

It is moreover found that the diameter and width of the rim no longer intervene in the determination of the correcting weights. It is therefore possible to balance the wheel with the aid of correcting weights disposed on rim rings of different diameters, which is particularly advantageous in the case of aluminium or other rims whose shape does not permit mounting of correcting weights on rim rings of similar diameters.

The standard weights may obviously be of any desired value and even be different from one another. Similarly, these weights may be spaced apart by a variable angle, which may be smaller or larger than 90° but must never be equal to 180°, this angle being adapted to the number of slits in the disc 12.

Moreover, since the characteristic relationship of the wheel-apparatus assembly is common to all identical wheels of a given vehicle, the storing of this relation in the memory 24 makes it possible for these other wheels to be balanced extremely quickly and simply.

We claim:

1. A process for balancing a wheel having a rim by means of an apparatus comprising a shaft which is for driving in rotation and supported by two spaced-apart bearings, each bearing being associated with a force sensor, said process comprising fixing said wheel coaxially on the shaft, taking two weights of known values and mounting them one on each side of the wheel rim in positions spaced angularly apart by a given value relative to the axis of the shaft, effecting a first measurement by means of the sensors of the forces generated in the bearings by the rotation of the wheel, measuring the angular position of the wheel, removing said two weights, effecting a second measurement of the forces generated in the bearings by the rotation of the wheel devoid of said weights, comparing the results of said two measurements, deducing therefrom the characteristic relation of the assembly comprising said apparatus and said wheel mounted on said shaft, solving said characteristic relation and combining the solution with the result of said second measurement to obtain the value of the balancing weights required for compensating for the unbalance of the wheel.

2. A process as claimed in claim 1, wherein the forces exerted on the bearings and measured by the force sensors are transmitted to a device which calculates the relation between the components of the signals and the components of the correcting weights in each of said first and second measurements, and which then subtracts one of the two resulting relations from the other in order to deduce therefrom the characteristic relation of said wheel-apparatus assembly.

3. A process as claimed in claim 1, comprising monitoring the speed of rotation of the shaft and measuring the forces exerted on the bearings when said speed attains a given value, which is the same for said first and second measurements.

4. A process as claimed in claim 1, comprising determining a reference angular position of the shaft and wheel, placing the first weight on the wheel, turning the wheel through an angle corresponding to the desired angular distance between the weights, then placing the second weight on the wheel rim.

5. A process as claimed in claim 1, wherein said two known weights are identical.

6. A process as claimed in claim 1, wherein said angular distance between the weights placed on the wheel rim is less than 180°.

7. A process as claimed in claim 6, wherein said angular distance is 90°.

8. A process as claimed in claim 1, comprising storing the characteristic relation of said wheel-apparatus assembly for the purpose of the balancing of other similar wheels.

9. An apparatus for balancing a vehicle wheel having a rim, comprising a rotary shaft which is provided with means for fastening the wheel on the shaft in coaxial relation to the shaft, spaced-apart bearings in which the shaft is rotatively mounted, a force sensor associated with each bearing, means for monitoring the rotation of the shaft, means for determining the angular position of the shaft relative to a reference position about the axis of the shaft, two weights of known values detachably placed on opposite sides of the rim of the wheel and angularly spaced apart on said rim relative to the axis of the wheel, means for calculating from the determination of the angular position of the shaft and from the forces signalled by the sensors the relations between the components of the measured signals and the components of the compensating weights to be placed on the rim in the course of a first measurement concerning the wheel provided with said two weights, and then in the course of a second measurement concerning the wheel alone after removal of said weights, a memory for storing the values measured by the sensors, means for comparing the relations obtained in said two successive measurements for deducing therefrom the relation between the components of the measured signals and the components of the compensating weights to be placed on the wheel proper to the assembly of the apparatus and the wheel mounted on the shaft, then introducing this relation in the memory, and means for determining from the values of the second measurement and from the relation proper to the assembly of the apparatus and of the wheel mounted on the shaft the compensating weights to be placed on the rim of the wheel.

10. An apparatus as claimed in claim 9, comprising means for monitoring the speed of rotation of the shaft and the wheel mounted thereon.

11. An apparatus as claimed in claim 9, wherein the means for determining the angular position of the shaft comprise a disc having a series of slits evenly spaced apart in a circumference and a slit radially offset in relation to the series of slits, said disc being fixed to the shaft, and an optical scanner located in facing relation to the disc and capable of detecting independently the slits in said series of slits and said offset slit.

12. An apparatus as claimed in claim 9, further comprising a circuit for bringing into operation and erasing the memory and a switch for controlling said circuit.

13. An apparatus as claimed in claim 11, further comprising light signals for indicating the angular position of the disc.

14. An apparatus as claimed in claim 9, further comprising means for producing an acoustic signal indicating the end of the measurement.

15. An apparatus as claimed in claim 9, further comprising a display panel for indicating the values of the compensating weights to be placed on the rim and the position of the compensating weights connected to the computing device.

* * * * *